US011865375B2

(12) United States Patent
Mittelstadt et al.

(10) Patent No.: US 11,865,375 B2
(45) Date of Patent: Jan. 9, 2024

(54) RESPIRATOR FIT CHECK SEALING DEVICES AND METHODS

(71) Applicant: 3M INNOVATIVE PROPERTIES COMPANY, St. Paul, MN (US)

(72) Inventors: William A Mittelstadt, Cottage Grove, MN (US); David M. Blomberg, Lino Lakes, MN (US); Thomas W. Holmquist-Brown, Hastings, MN (US); Adam J. Cernohous, River Falls, WI (US); Michael J. Cowell, Woodbury, MN (US)

(73) Assignee: 3M innovative Properties Company, St. Paul, MN (US)

( * ) Notice: Subject to any disclaimer, the term of this patent is extended or adjusted under 35 U.S.C. 154(b) by 0 days.

(21) Appl. No.: 17/457,957

(22) Filed: Dec. 7, 2021

(65) Prior Publication Data

US 2022/0088422 A1 Mar. 24, 2022

Related U.S. Application Data

(63) Continuation of application No. 16/087,914, filed as application No. PCT/US2017/022401 on Mar. 15, 2017, now Pat. No. 11,219,787.

(Continued)

(51) Int. Cl.
*A62B 18/10* (2006.01)
*A62B 18/02* (2006.01)

(Continued)

(52) U.S. Cl.
CPC ............ *A62B 18/10* (2013.01); *A62B 18/025* (2013.01); *A62B 19/00* (2013.01); *A62B 18/084* (2013.01)

(58) Field of Classification Search
CPC .... A62B 7/00; A62B 7/10; A62B 9/00; A62B 9/027; A62B 9/022; A62B 18/00;

(Continued)

(56) References Cited

U.S. PATENT DOCUMENTS

| | | | |
|---|---|---|---|
| 2,055,853 | A | 9/1936 | Schwartz |
| 2,062,834 | A | 12/1936 | Schwartz |

(Continued)

FOREIGN PATENT DOCUMENTS

| | | |
|---|---|---|
| AU | 2008202095 | 6/2008 |
| CA | 2402743 | 10/2001 |

(Continued)

OTHER PUBLICATIONS

"Chemical Cartridge Respirators," Koken Website, 2007 [retrieved from the Internet on Feb. 19, 2016], URL<http://www.koken-ltd.co.jp/english/chemicalcartridgerespirators.htm>, 5 pages.

(Continued)

*Primary Examiner* — Tu A Vo
*Assistant Examiner* — Kelsey E Baller
(74) *Attorney, Agent, or Firm* — Melissa E. Buss

(57) ABSTRACT

A respiratory protection device that includes a valve assembly operable between an open configuration and a closed configuration. In some exemplary embodiments, the respiratory protection device includes an elastomeric seal, and a valve assembly and a breathing air source component are in sealing engagement with the elastomeric seal when the valve assembly is in the closed configuration.

19 Claims, 12 Drawing Sheets

Related U.S. Application Data

(60) Provisional application No. 62/313,942, filed on Mar. 28, 2016.

(51) Int. Cl.
*A62B 19/00* (2006.01)
*A62B 18/08* (2006.01)

(58) Field of Classification Search
CPC ....... A62B 18/02; A62B 18/025; A62B 18/06; A62B 18/08; A62B 23/00; A62B 23/02; A62B 23/025; A61M 39/24; A61M 2039/2406–2493; A61M 16/208; F16K 7/04; F16K 7/06
See application file for complete search history.

(56) References Cited

U.S. PATENT DOCUMENTS

| | | | |
|---|---|---|---|
| 2,168,695 | A | 8/1939 | Asari |
| 2,235,624 | A | 3/1941 | Schwartz |
| 2,787,333 | A | 4/1957 | Boone |
| 3,167,070 | A | 1/1965 | Silverman |
| 3,232,290 | A | 2/1966 | Nicolai |
| 3,594,816 | A | 7/1971 | Webb |
| 3,605,204 | A | 9/1971 | Amundsen |
| 3,703,750 | A | 11/1972 | Irwin, Jr. |
| 3,879,586 | A | 4/1975 | DuRocher |
| 3,898,700 | A | 8/1975 | Davison |
| 4,224,694 | A | 9/1980 | Palmaer |
| 4,276,657 | A | 7/1981 | Montesi |
| 4,390,765 | A | 6/1983 | Sado |
| 4,414,973 | A | 11/1983 | Matheson |
| 4,464,797 | A | 8/1984 | Glassman |
| 4,555,815 | A | 12/1985 | Walther |
| 4,562,837 | A | 1/1986 | Schlobohm |
| 4,574,799 | A | 3/1986 | Warncke |
| 4,604,509 | A | 8/1986 | Clancy |
| 4,764,989 | A | 8/1988 | Bourgeois |
| 4,790,306 | A | 12/1988 | Braun |
| 4,817,596 | A | 4/1989 | Gallet |
| 4,886,058 | A | 12/1989 | Brostrom |
| 4,905,683 | A | 3/1990 | Cronjaeger |
| 4,921,512 | A | 5/1990 | Maryyanek |
| 4,932,399 | A | 6/1990 | Cappa |
| 4,981,134 | A | 1/1991 | Courtney |
| 5,062,421 | A | 11/1991 | Burns |
| 5,086,768 | A | 2/1992 | Niemeyer |
| 5,148,803 | A | 9/1992 | Schlobohm |
| 5,154,168 | A | 10/1992 | Schlobohm |
| 5,199,780 | A | 4/1993 | Ekman |
| 5,299,448 | A | 4/1994 | Maryyanek |
| 5,372,130 | A | 12/1994 | Stern |
| RE35,062 | E | 10/1995 | Brostrom |
| 5,499,624 | A | 3/1996 | Kruger |
| 5,501,213 | A | 3/1996 | Jackson |
| 5,505,197 | A | 4/1996 | Scholey |
| 5,515,846 | A | 5/1996 | Drews |
| 5,540,218 | A | 7/1996 | Jones |
| 5,555,569 | A | 9/1996 | Lane |
| 5,579,761 | A | 12/1996 | Yuschak |
| 5,592,935 | A | 1/1997 | Elstran |
| 5,611,925 | A | 3/1997 | Yasue |
| 5,647,356 | A | 7/1997 | Osendorf |
| 5,647,357 | A | 7/1997 | Barnett |
| 5,659,296 | A | 8/1997 | Debe |
| 5,666,663 | A | 9/1997 | Bolle |
| 5,666,949 | A | 9/1997 | Debe |
| 5,669,375 | A | 9/1997 | Dahrendorf |
| 5,687,767 | A | 11/1997 | Bowers |
| 5,732,695 | A | 3/1998 | Metzger |
| 5,803,076 | A | 9/1998 | Myers |
| 5,924,420 | A | 7/1999 | Reischel |
| 5,937,439 | A | 8/1999 | Barthold |
| 5,937,857 | A | 8/1999 | Caterini |
| 5,940,891 | A | 8/1999 | Lane |
| 5,967,142 | A | 10/1999 | Dorcheh |
| 5,975,079 | A | 11/1999 | Hellings |
| 6,016,802 | A | 1/2000 | Jackson |
| 6,016,804 | A | 1/2000 | Gleason |
| 6,167,882 | B1 | 1/2001 | Almqvist |
| 6,196,223 | B1 | 3/2001 | Belfer |
| 6,206,003 | B1 | 3/2001 | Burch |
| 6,216,693 | B1 | 4/2001 | Rekow |
| 6,269,814 | B1 | 8/2001 | Blaszczykiewicz |
| 6,298,849 | B1 | 10/2001 | Scholey |
| 6,345,620 | B2 | 2/2002 | Salapow |
| 6,408,845 | B1 | 6/2002 | Pereira |
| 6,418,928 | B1 | 7/2002 | Bordewick |
| 6,460,539 | B1 | 10/2002 | Japuntich |
| 6,470,886 | B1 | 10/2002 | Jestrabek-Hart |
| 6,490,729 | B1 | 12/2002 | Dondero |
| 6,550,479 | B1 | 4/2003 | Duxbury |
| 6,575,165 | B1 | 6/2003 | Cook |
| 6,584,976 | B2 | 7/2003 | Japuntich |
| 6,648,848 | B1 | 11/2003 | Keldmann |
| 6,659,102 | B1 | 12/2003 | Sico |
| 6,701,925 | B1 | 3/2004 | Resnick |
| 6,712,072 | B1 | 3/2004 | Lang |
| 6,732,733 | B1 | 5/2004 | Brostrom |
| 6,761,169 | B2 | 7/2004 | Eswarappa |
| 6,793,702 | B2 | 9/2004 | Eswarappa |
| 6,817,362 | B2 | 11/2004 | Gelinas |
| 6,854,464 | B2 | 2/2005 | Mukaiyama |
| 6,874,499 | B2 | 4/2005 | Viner |
| 6,883,518 | B2 | 4/2005 | Mittelstadt |
| 6,886,559 | B2 | 5/2005 | McDonald |
| 6,928,657 | B2 | 8/2005 | Bell |
| 6,997,206 | B1 | 2/2006 | Klockseth |
| 7,025,060 | B1 | 4/2006 | Nicholson |
| 7,059,326 | B2 | 6/2006 | Heidmann |
| 7,100,608 | B2 | 9/2006 | Brewer |
| 7,101,412 | B2 | 9/2006 | Gossweiler |
| 7,114,496 | B1 | 10/2006 | Resnick |
| 7,118,608 | B2 | 10/2006 | Lovell |
| 7,121,279 | B2 | 10/2006 | Dennis |
| 7,158,822 | B2 | 1/2007 | Payne, Jr. |
| RE39,493 | E | 2/2007 | Yuschak |
| 7,171,966 | B2 | 2/2007 | Schrader |
| 7,188,622 | B2 | 3/2007 | Martin |
| 7,213,595 | B2 | 5/2007 | Capon |
| 7,296,568 | B2 | 11/2007 | Capon |
| 7,302,951 | B2 | 12/2007 | Mittelstadt |
| 7,320,722 | B2 | 1/2008 | Mittelstadt |
| 7,353,826 | B2 | 4/2008 | Sleeper |
| 7,419,526 | B2 | 9/2008 | Greer |
| 7,464,705 | B2 | 12/2008 | Tanizawa |
| 7,543,584 | B2 | 6/2009 | Brookman |
| 7,559,323 | B2 | 7/2009 | Hacke |
| 7,584,751 | B1 | 9/2009 | Brooks, Jr. |
| 7,587,929 | B2 | 9/2009 | Zielinski |
| 7,650,884 | B2 | 1/2010 | Flannigan |
| 7,669,599 | B2 | 3/2010 | Gunaratnam |
| 7,762,258 | B2 | 7/2010 | Zollinger |
| 7,827,990 | B1 | 11/2010 | Melidis |
| 7,836,886 | B2 | 11/2010 | McDonald |
| 7,849,856 | B2 | 12/2010 | Mittelstadt |
| 7,866,010 | B2 | 1/2011 | Schmidtke |
| 7,866,319 | B2 | 1/2011 | Penton |
| 7,908,668 | B2 | 3/2011 | Folkesson |
| 7,997,275 | B2 | 8/2011 | Quinn |
| 8,006,691 | B2 | 8/2011 | Kenyon |
| 8,011,368 | B2 | 9/2011 | Crutchfield |
| 8,015,626 | B2 | 9/2011 | Grassi |
| 8,066,006 | B2 | 11/2011 | Daugaard |
| 8,069,853 | B2 | 12/2011 | Tilley |
| 8,104,472 | B2 | 1/2012 | Henderson |
| 8,118,026 | B2 | 2/2012 | Gebrewold |
| 8,176,918 | B2 | 5/2012 | Teng |
| 8,266,724 | B2 | 9/2012 | Grilliot |
| 8,267,088 | B2 | 9/2012 | Steindorf |
| 8,272,382 | B2 | 9/2012 | Howard |
| 8,291,906 | B2 | 10/2012 | Kooij |
| 8,312,876 | B2 | 11/2012 | Mutze |

(56) References Cited

U.S. PATENT DOCUMENTS 8,327,850 B2 12/2012 Ng
8,336,547 B1 12/2012 Ritchie
8,342,180 B2 1/2013 Martin
8,365,771 B2 2/2013 Xue
8,402,966 B2 3/2013 Morgan, III
8,402,971 B2 3/2013 Scheiner
8,443,806 B2 5/2013 Morelli
8,460,423 B2 6/2013 Legare
8,496,005 B2 7/2013 McDonald
8,505,536 B2 8/2013 Kielow
8,528,559 B2 9/2013 Crutchfield
8,550,084 B2 10/2013 Ng
8,573,201 B2 11/2013 Rummery
8,631,792 B2 1/2014 Ho
8,678,003 B2 3/2014 Darkin
8,708,708 B1 4/2014 Carideo
8,720,443 B2 5/2014 Kooij
8,770,195 B2 7/2014 Stone
8,839,788 B2 9/2014 Betz
9,095,800 B2 8/2015 Symons
9,149,669 B2 10/2015 Cowell
D764,656 S 8/2016 Skov
2001/0013347 A1 8/2001 Rekow
2002/0195108 A1 12/2002 Mittelstadt
2002/0195109 A1 12/2002 Mittelstadt
2003/0200969 A1 10/2003 Kintzel
2003/0217752 A1 11/2003 Muller
2004/0003810 A1 1/2004 Templeton
2004/0025880 A1 2/2004 Capon
2005/0085799 A1 4/2005 Luria
2005/0126572 A1 6/2005 Gosweiler
2006/0076012 A1 4/2006 Tanizawa
2006/0225738 A1 10/2006 Afentoulopoulos
2006/0283453 A1 12/2006 Haddad
2006/0283455 A1 12/2006 Walker
2007/0157439 A1 7/2007 Schmidtke
2007/0186926 A1 8/2007 Morgan
2007/0272169 A1 11/2007 Barney
2008/0135050 A1 6/2008 Hitchcock
2008/0178884 A1 7/2008 Gerson
2008/0245364 A1 10/2008 Patterson
2009/0000624 A1 1/2009 Lee
2009/0044808 A1 2/2009 Guney
2009/0065729 A1 3/2009 Worboys
2009/0078264 A1 3/2009 Martin
2009/0107515 A1 4/2009 Gavriely
2009/0139526 A1 6/2009 Melidis
2009/0188506 A1 7/2009 Duke
2009/0217926 A1 9/2009 Hine
2009/0235934 A1 9/2009 Martin
2009/0250060 A1 10/2009 Hacke
2009/0266361 A1 10/2009 Bilger
2009/0268153 A1 10/2009 Wang-Lee
2010/0108067 A1 5/2010 Walker
2010/0132714 A1 6/2010 Morelli
2010/0206311 A1 8/2010 Flannigan
2010/0218761 A1 9/2010 Flannigan
2010/0224194 A1 9/2010 Walker
2010/0269833 A1 10/2010 Gillotin
2010/0307506 A1 12/2010 Kielow
2010/0313891 A1 12/2010 Veliss
2010/0319701 A1 12/2010 Connell
2011/0000481 A1 1/2011 Gumaste
2011/0100372 A1 5/2011 Betz
2011/0240027 A1 10/2011 Billingsley
2011/0290253 A1 12/2011 McAuley
2011/0314595 A1 12/2011 Kobayashi
2012/0000465 A1 1/2012 Cavaliere
2012/0024289 A1 2/2012 Johnstone
2012/0042878 A1 2/2012 Woo
2012/0080035 A1 4/2012 Guney
2012/0167890 A1 7/2012 Insley
2012/0168658 A1 7/2012 Insley
2012/0174922 A1 7/2012 Virr
2012/0199130 A1 8/2012 Euvrard
2012/0204879 A1 8/2012 Cariola
2012/0234326 A1 9/2012 Mazzone
2012/0260920 A1 10/2012 Choi
2012/0318265 A1 12/2012 Amirav
2013/0004358 A1 1/2013 Underwood, Jr.
2013/0104900 A1 5/2013 Tobias
2013/0125896 A1 5/2013 Dwyer
2013/0133628 A1 5/2013 Fornara
2013/0133664 A1 5/2013 Startare
2013/0180523 A1 7/2013 Huggins
2013/0186394 A1 7/2013 Hallett
2013/0199520 A1 8/2013 Dhuper
2013/0228184 A1 9/2013 Lee
2013/0239972 A1 9/2013 McAuley
2013/0269513 A1 10/2013 Estirado Vera
2013/0298775 A1 11/2013 Fiet
2013/0319420 A1 12/2013 Danford
2013/0327323 A1 12/2013 Rubin
2014/0007888 A1 1/2014 Sanchez Talero
2014/0076325 A1 3/2014 Rosert
2014/0096768 A1 4/2014 Lee
2014/0096774 A1 4/2014 Olsen
2014/0109301 A1 4/2014 Hall
2014/0190476 A1 7/2014 Stinton
2014/0216447 A1 8/2014 Kihlberg
2014/0216472 A1 8/2014 Brace
2014/0216473 A1 8/2014 Dwyer
2014/0216474 A1* 8/2014 Mittelstadt ........ A61M 16/0605
128/863
2014/0216475 A1 8/2014 Blomberg
2014/0216476 A1 8/2014 Brace
2014/0251327 A1 9/2014 Mittelstadt
2014/0261437 A1 9/2014 Catanzarite
2014/0345607 A1 11/2014 Skov
2015/0151143 A1 2/2015 Langford
2015/0082914 A1 3/2015 Pike
2015/0107596 A1 4/2015 Mashiko
2015/0136142 A1* 5/2015 Blomberg ................ A62B 7/10
128/206.17
2015/0202473 A1 7/2015 Curran

FOREIGN PATENT DOCUMENTS

CN 1040508 3/1990
CN 2800855 8/2006
CN 201171848 Y 12/2008
CN 102233160 11/2011
CN 202364901 8/2012
CN 203194645 9/2013
CN 203235112 10/2013
CN 203290282 11/2013
CN 203467742 3/2014
CN 104544685 4/2015
CN 204306113 5/2015
DE 2645008 4/1978
DE 10057473 5/2002
DE 202014105242 6/2015
EP 0182550 B1 8/1989
EP 2017508 1/2009
FR 2607916 6/1988
FR 2854575 11/2004
FR 2903864 1/2008
FR 2906670 4/2008
GB 472897 9/1937
GB 591531 8/1947
GB 861574 2/1961
GB 1048258 11/1966
GB 1511303 5/1978
GB 2388787 11/2003
GB 2472835 2/2011
JP S60-99946 U 7/1985
JP 0418581 4/1992
JP 6099947 4/1994
JP 11151312 6/1999
JP 2001-104364 4/2001
JP 2001-104501 4/2001
JP 2001309990 A 11/2001
JP 2006-346269 12/2006
JP 2011-055896 3/2011

(56) References Cited

FOREIGN PATENT DOCUMENTS

| | | |
|---|---|---|
| JP | 2011-246860 | 12/2011 |
| JP | 5610274 | 12/2011 |
| JP | 2012-040336 | 3/2012 |
| KR | 100773460 | 11/2007 |
| KR | 2012-0000355 | 1/2012 |
| WO | WO 2002-093045 | 11/2002 |
| WO | WO 2003-090873 | 11/2003 |
| WO | WO 2003-099385 | 12/2003 |
| WO | WO 2006-114505 | 11/2006 |
| WO | WO 2006-129028 | 12/2006 |
| WO | WO 2006-135231 | 12/2006 |
| WO | WO 2008-082415 | 7/2008 |
| WO | WO 2008-134905 | 11/2008 |
| WO | WO 2010-095168 | 8/2010 |
| WO | WO 2012-100116 | 7/2012 |
| WO | WO 2013-187278 | 12/2013 |
| WO | WO 2013-187279 | 12/2013 |
| WO | WO 2014-120500 | 8/2014 |
| WO | WO 2014-120527 | 8/2014 |
| WO | WO 2014-120597 | 8/2014 |
| WO | WO 2015-073414 | 5/2015 |
| WO | WO 2017-172361 | 10/2017 |
| WO | WO 2017-172510 | 10/2017 |

OTHER PUBLICATIONS

"Particulate Respirators," Koken Website, 2007 [retrieved from the Internet on Feb. 19, 2016] URL<http://www.kokenltd.co.jp/english/particulaterespirators.htm>, 4 pages.

"Respirator Set / Options," Koken Website, 2007 [retrieved from the Internet on Jun. 28, 2016] URL<http://www.koken-ltd.co.jp/english/respiratorset.htm>, 2 pages.

International Search Report for PCT International Application No. PCT/US2017/022401, dated May 24, 2017, 2 pages.

* cited by examiner

RESPIRATOR FIT CHECK SEALING DEVICES AND METHODS

CROSS REFERENCE TO RELATED APPLICATIONS

This application is a continuation of U.S. application Ser. No. 16/087,914, filed Sep. 24, 2018, which is a national stage filing under 35 U.S.C. 371 of PCT/US2017/022401, filed Mar. 15, 2017, which claims the benefit of U.S. Provisional Application No. 62/313,942 filed Mar. 28, 2016, the disclosure of which is incorporated by reference in its/their entirety herein.

TECHNICAL FIELD

This disclosure describes respiratory protection devices and methods including fit check devices, and in some embodiments, respiratory protection devices including an elastomeric seal.

BACKGROUND

Respirator protection devices that cover a user's nose and mouth, for example, and provide breathable air to a wearer are well known. Air is drawn through a breathable air source by a wearer or forced by a fan or blower into a breathing zone where the air may be inhaled by the wearer.

In order to effectively deliver breathable air to a wearer, respiratory protection devices prevent unfiltered air from entering the mask. Various techniques have been proposed for testing the integrity of a face seal, for example, of a respiratory protection device. In a positive pressure test, an exhalation valve of the respiratory protection device is blocked while the wearer exhales into the mask. An adequate seal may be signaled by an increased internal pressure due to an inability of air to exit the mask if a leak is not present. Alternatively, negative pressure tests have been proposed in which a filter cartridge port is blocked while a wearer inhales while wearing the mask. An adequate seal may be signaled by a reduced internal pressure due to the inability of air to enter the mask if a leak is not present. Various mechanisms have been provided for blocking one or more ports to facilitate a negative or positive pressure test.

SUMMARY

Particular embodiments described herein provide a respiratory protection device including a mask body defining a breathable air zone for a wearer, a first elastomeric seal, a first breathing air source component configured for attachment to the mask body in sealing engagement with the first elastomeric seal, and a valve assembly operable between an open configuration and a closed configuration in which fluid communication through the first breathing air source component to the breathable air zone is prevented. The valve assembly is in sealing engagement with the first elastomeric seal in the closed configuration.

Embodiments can include any, all, or none of the following features. The valve assembly may include an actuator and a first sealing surface, the first sealing surface sealingly engaged with the first elastomeric seal when the valve assembly is in the closed configuration. The actuator may be configured to move linearly along a longitudinal axis between the open and closed configurations. The sealing surface may be configured to move linearly between the open and closed configurations. The sealing surface may be configured to pivot between the open and closed configurations. The sealing surface may include a projection extending towards an interior of the elastomeric seal when the valve assembly is in the closed configuration. The elastomeric seal may include first and second end regions, an outer surface, and an inner surface defining a channel configured to receive the first breathing air source component. The breathing air source component may be in sealing engagement with the inner surface of the elastomeric seal when attached to the mask body. At least a portion of the outer surface of the elastomeric seal may be out of contact with a rigid component when the valve assembly is in the open configuration. The second end region of the elastomeric seal may be a floating end. A first sealing surface of the valve assembly may be sealingly engaged with the second end region of the elastomeric seal when the valve assembly is in the closed configuration. The second end region of the elastomeric seal may include an inward-turned end. In the closed configuration the first sealing surface of the valve assembly may contact the outer surface at the inward-turned end. In the closed configuration the second end region of the elastomeric seal may be clamped shut by a first sealing surface of the valve assembly. The elastomeric seal may have a reduced material thickness at the second end region, the second end region configured to open when air flows from the first end region towards the second end region and configured to close to prevent airflow from the second end region towards the first end region. The respiratory protection device may include a second breathing air source component configured for attachment to the mask body. The respiratory protection device may include a second elastomeric seal and a second breathing air source component configured for attachment to the mask body, wherein the second breathing air source component is in sealing engagement with the second elastomeric seal when attached to the mask body, and the valve assembly is in sealing engagement with the second elastomeric seal in the closed configuration.

Particular embodiments described herein provide a respiratory protection device including a mask body defining a breathable air zone for a wearer and having a first receiver, the first receiver including a first elastomeric seal having a first end region and a second end region and defining a first channel configured to at least partially receive a first breathing air source component, and a valve assembly operable between an open configuration and a closed configuration in which fluid communication between the first breathing air source component and the breathable air zone is blocked. The valve assembly engages with the second end region of the elastomeric seal when the valve assembly is in the closed position to prevent fluid communication between the breathing air source component and the breathable air zone, and the elastomeric seal is configured to sealingly engage with the breathing air source component at the first end region of the elastomeric seal.

Embodiments can include any, all, or none of the following features. The first receiver may be integral with the mask body. The first receiver may be positioned in an opening defined by the mask body. The second end region of the elastomeric seal may include an inward-turned end. The elastomeric seal may include an inner surface defining the channel through the elastomeric seal, and an outer surface. The outer surface may be out of contact with a rigid component when the valve assembly is in the open position. The second end region may be a floating end. The valve assembly may engage a portion of the outer surface of the elastomeric seal in the closed configuration. The mask body may include a second receiver, the second receiver including a second elastomeric seal having a first end region and a second end region and defining a second channel configured to receive a second breathing air source component. The valve assembly may engage with the second end region of the second elastomeric seal when the valve assembly is in the closed position to prevent fluid communication between the second breathing air source component and the breathable air zone, and the elastomeric seal may be configured to sealingly engage with the second breathing air source component at the first end region of the elastomeric seal. The valve assembly may be biased towards the open configuration. The actuator may include a button, and the button may be depressed when the valve assembly is in the closed configuration.

Particular embodiments described herein provide a method of operating a respiratory protection device, including operating a valve assembly from an open configuration, in which a breathing air source component attached to a mask body is in sealing engagement with an elastomeric seal and in fluid communication with a breathable air zone defined by the mask body, to a closed configuration in which fluid communication through the breathing air source component is closed. Operating the valve assembly to a closed configuration causes sealing engagement between the valve assembly and the elastomeric seal. The valve assembly may include a sealing surface that engages with the elastomeric seal in the closed configuration. Operating the valve assembly to a closed configuration may include clamping an end region of the elastomeric seal to prevent airflow through a channel defined by the elastomeric seal.

The details of one or more embodiments are set forth in the accompanying drawings and the description below. The above summary is not intended to describe each disclosed embodiment or every embodiment. Other features and advantages will be apparent from the description and drawings, and from the claims.

DESCRIPTION OF DRAWINGS

The present description is further provided with reference to the appended Figures, wherein like structure is referred to be like numerals throughout the several views, and wherein.

While the above-identified figures set forth various embodiments of the disclosed subject matter, other embodiments are also contemplated. In all cases, this disclosure presents the disclosed subject matter by way of representation and not limitation.

DETAILED DESCRIPTION OF ILLUSTRATIVE EMBODIMENTS

The present disclosure provides a respiratory protection device including a mask body defining a breathable air zone for a wearer configured to receive one or more breathing air source components. The respiratory protection device includes a valve assembly selectively operable between an open position in which breathable air may pass from the breathing air source components into the breathable air zone, and a closed position in which airflow is blocked. In some exemplary embodiments, respiratory protection includes an elastomeric seal, and a breathing air source component and the valve assembly is in sealing engagement with the elastomeric seal in the closed configuration.

Figure 1:
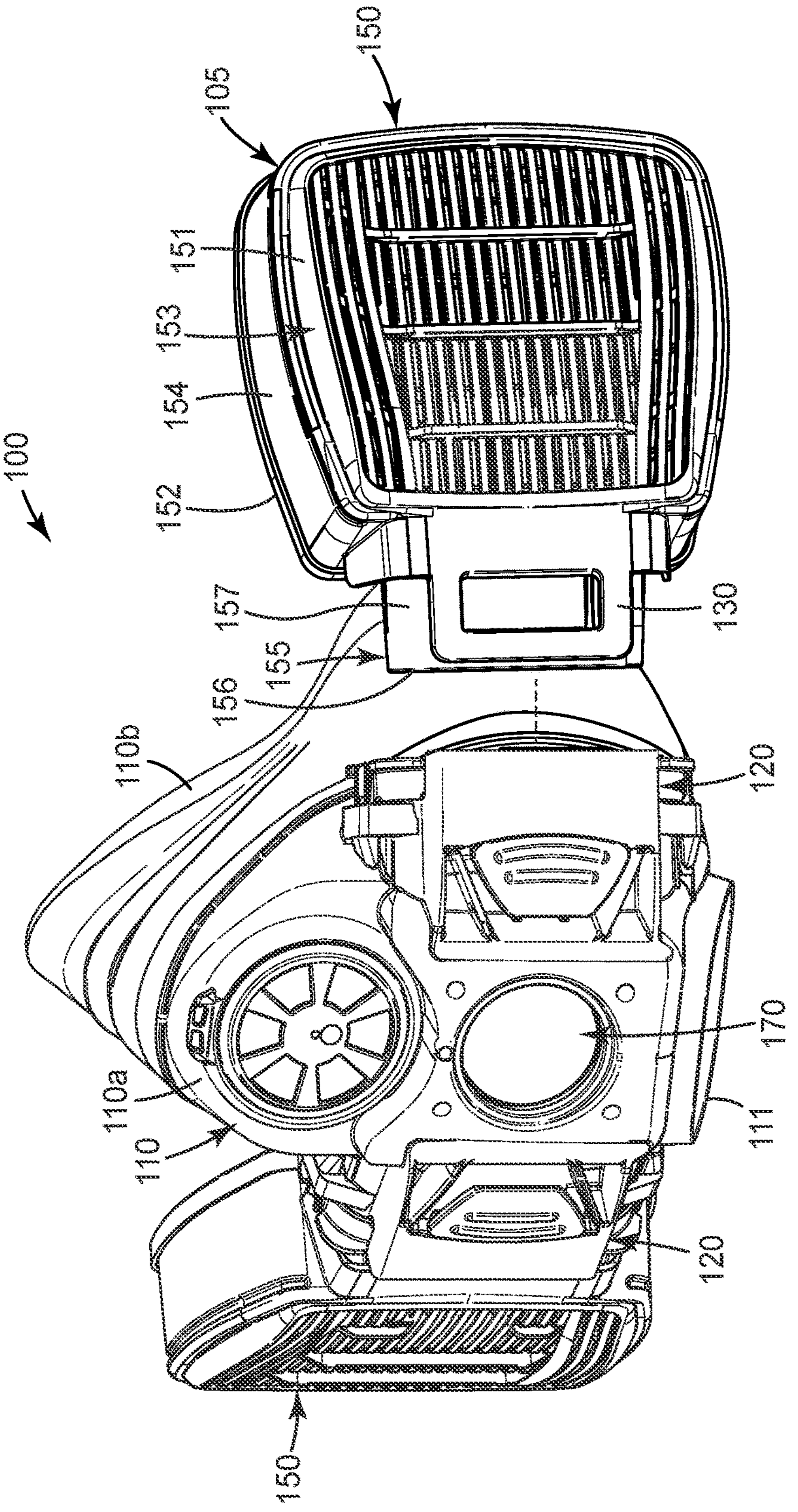
FIG. 1 is a perspective view of an exemplary respiratory protection device.

Referring to FIG. 1, an exemplary respiratory protection device 100 is shown that covers the mouth and/or nose of a wearer. Respiratory protection device 100 includes a mask body 110 having one or more receivers 120. One or more breathing air source components 150 may be attached to mask body 110 at the one or more receivers 120. First and second breathing air source components 150 may include filter cartridges that filter air received from the external environment before the air enters a breathable air zone of the mask body. In other exemplary embodiments, first and second breathing air source components 150 may include a supplied air component, such as a tube or conduit, powered air purifying respirator component, or other appropriate breathing air source component 150.

Mask body 110 may include a rigid or semi-rigid portion 110*a* and a compliant face contacting portion 110*b*. Compliant face contacting portion 110*b* includes a flexible material allowing mask body 110 to be comfortably supported over a person's nose and mouth and/or provide an adequate seal with the face of a wearer. Face contacting member 110*b* may have an inturned cuff to facilitate a comfortable and snug fit over the wearer's nose and against the wearer's cheeks. Rigid or semi-rigid portion 110*a* may provide structural integrity to mask body 110. In various exemplary embodiments, mask body portions 110*a*, 110*b* may be provided integrally or as one or more separately formed portions that are subsequently joined together in permanent or removable fashion.

Mask body 110 includes an exhalation port 111 that allows air to be purged from an interior space within mask body 110 during exhalation by the wearer. In an exemplary embodiment, exhalation valve is located centrally on mask body 110. An exhalation valve, including a diaphragm or check-valve, for example, selectively allows air to exit due to positive pressure within mask body 110, while preventing ingress of external air. In some exemplary embodiments, exhalation port 111 is positioned at a relatively lower portion of the mask body, for example below the mouth of a wearer.

A harness or other support assembly (not shown in FIG. 1) may be provided to support mask body 110 in position over the mouth and/or nose of a wearer. In an exemplary embodiment, a harness includes one or more straps that pass behind a wearer's head and/or may be attached to a crown member or a headwear suspension supported on a wearer's head, for example.

One or more breathing air source components 150, such as filter cartridges, may be attached to mask body 110 at first and second receivers 120. In an exemplary embodiment, first and second receivers 120 are positioned on opposite sides of mask body 110, proximate check portions of mask body 110, for example. First and second receivers 120 include complementary mating features such that filter cartridges may be securely attached to mask body 110. The mating features may provide a removable connection such that the first and second filter cartridges may be removed and replaced at the end of their service life or if use of a different breathing air source component is desired. Alternatively, the connection may be permanent so that the filter cartridge cannot be removed without damage to the filter cartridge.

A breathing air source component 150 may be secured to receiver 120 by one or more latches, threads, connectors, or complementary features, for example. In an exemplary embodiment, respiratory protection device 100 includes a cantilever latch 130 that secures breathing air source component 150 to receiver 120 of mask body 110. Cantilever latch 130 may be integral with breathing air source component 150, and substantially parallel and/or at least partially co-extending with an outlet nozzle 155. Receiver 120 and/or mask body 110 may include one or more complementary mating features that cooperate with cantilever latch 130 to provide a secure connection between body 110 and breathing air source component 150. In various exemplary embodiments, receiver 120 and/or mask body 110 may include a cantilever latch 130 that cooperates with a feature of breathing air source component 150, and cantilever latch 130 and/or a complementary mating feature may deflect to result in secure engagement.

Breathing air source component 150, such as a filter cartridge 105, may filter ambient air, for example, before the air passes into an interior space of mask body 110. In an exemplary embodiment, filter cartridge 105 includes a body portion 153 including first and second major surfaces 151, 152, and may include one or more sidewalls 154 extending at least partially between first and second major surfaces 151, 152. One or more of the first and second major surfaces 151, 152 and/or sidewall are at least partially fluid permeable to allow air to enter filter cartridge 105. In some exemplary embodiments, filter cartridge 105 may include primarily filter media without an outer housing or surrounded partially by a housing.

Filter cartridge 105 includes an outlet nozzle 155 to allow fluid to exit filter cartridge 105 into mask body 110. In an exemplary embodiment, outlet nozzle 155 extends outwardly from body portion 153, such as sidewall 154, and includes a leading end 156, an outer surface 157 and an inner surface defining an airflow channel through outlet nozzle 155. In various exemplary embodiments, outlet nozzle 155 may be positioned proximate any of first or second major surfaces 151, 152, one or more sidewalls 154, or a combination thereof.

Filter cartridge 105 is secured to mask body 110 at least in part by engaging with receiver 120. In an exemplary embodiment, outlet nozzle 155 is inserted into an opening of receiver 120 defined in part by an elastomeric seal (not shown in FIG. 1). A rigid outer portion or receiver 120, for example, may provide primary structural support and stability between mask body 110 and filter cartridge 105, and the elastomeric seal may sealingly engage outer surface 157 and/or other portions of outlet nozzle 155 and filter cartridge 150 to prevent ingress of contaminants or debris from an external environment.

Respiratory protection device 100 includes a valve assembly 170 to selectively prevent airflow from one or more breathing air source components 150 to the breathable air zone of mask body 110. Valve assembly 170 is operable between a closed configuration in which fluid communication between breathing air source component 150 is blocked, and an open configuration in which breathable air may flow from breathing air source component 150 to the breathable air zone of mask body 110, as described in greater detail herein.

Figure 2:
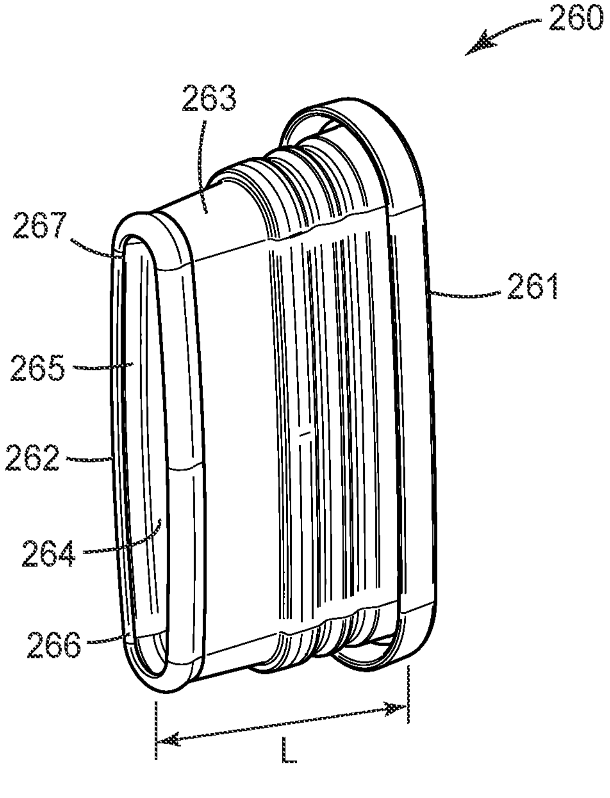
FIG. 2 is a perspective view of an exemplary elastomeric seal.

Referring to FIG. 2, an exemplary elastomeric seal 260 is shown, including a first end region 261, a second end region 262, an outer surface 263 and an inner surface 264 at least partially defining a channel 265. First end region 261 may be connected to a rigid component of a mask body, such as receiver 120 (FIG. 1). In an exemplary embodiment, elastomeric seal 260 provides an elastomeric sleeve that at least partially surrounds an outer surface of a breathing air source component, such as a filter cartridge 150, attached to mask body 110, and has a length (L) between first and second ends such that at least a portion of a breathing air source component 150 may be positioned within channel 265. In some exemplary embodiments, length (L) may be between 5 mm and 100 mm, 10 mm and 40 mm, or about 20 mm. Second end region 262 and/or various locations of elastomeric seal 260 may be floating or otherwise not anchored to a rigid component of mask body 110 such that elastomeric seal 260 may move or deform at least partially independently of a portion of mask body 110, as described in greater detail herein.

Second end region 262 is configured for sealing engagement with a component of a valve assembly, such as valve assembly 170, that selectively blocks airflow through elastomeric seal 260. Second end region 262 includes a perimeter 267 that may sealingly engage with a component of a valve assembly. For example, second end region 262 includes an inwardly-turned lip 266 at least partially extending around perimeter 267. Second end region 262, and/or inwardly-turned lip 266, provide a surface that a portion of valve assembly may readily contact to create a sealing engagement. Second end region 262, and/or perimeter 267, is conformable and flexible to facilitate adequate sealing to block airflow through channel 265.

Figure 3:
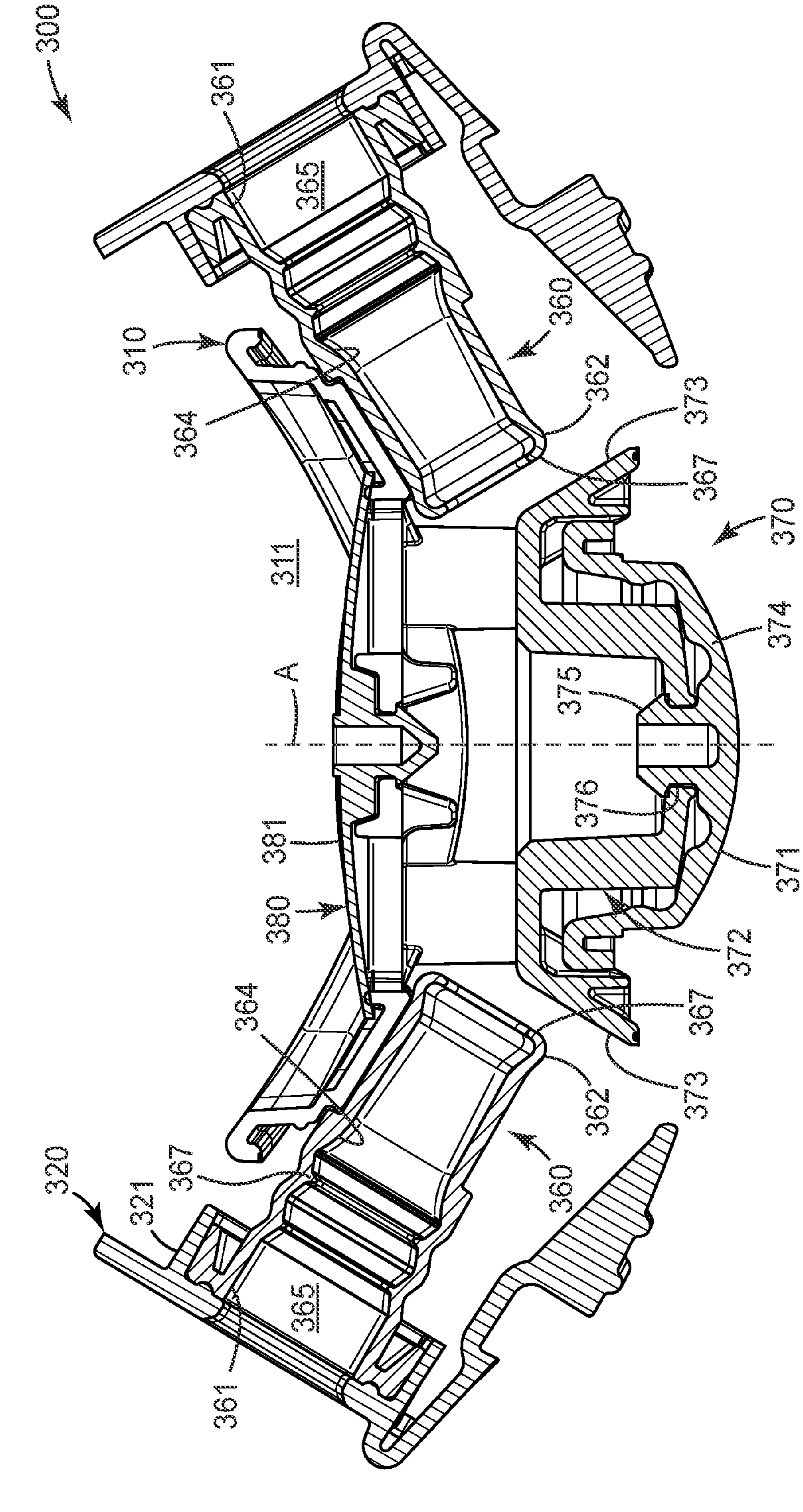
FIG. 3 is a partial cross-sectional view of an exemplary respiratory protection device.
Figure 4:
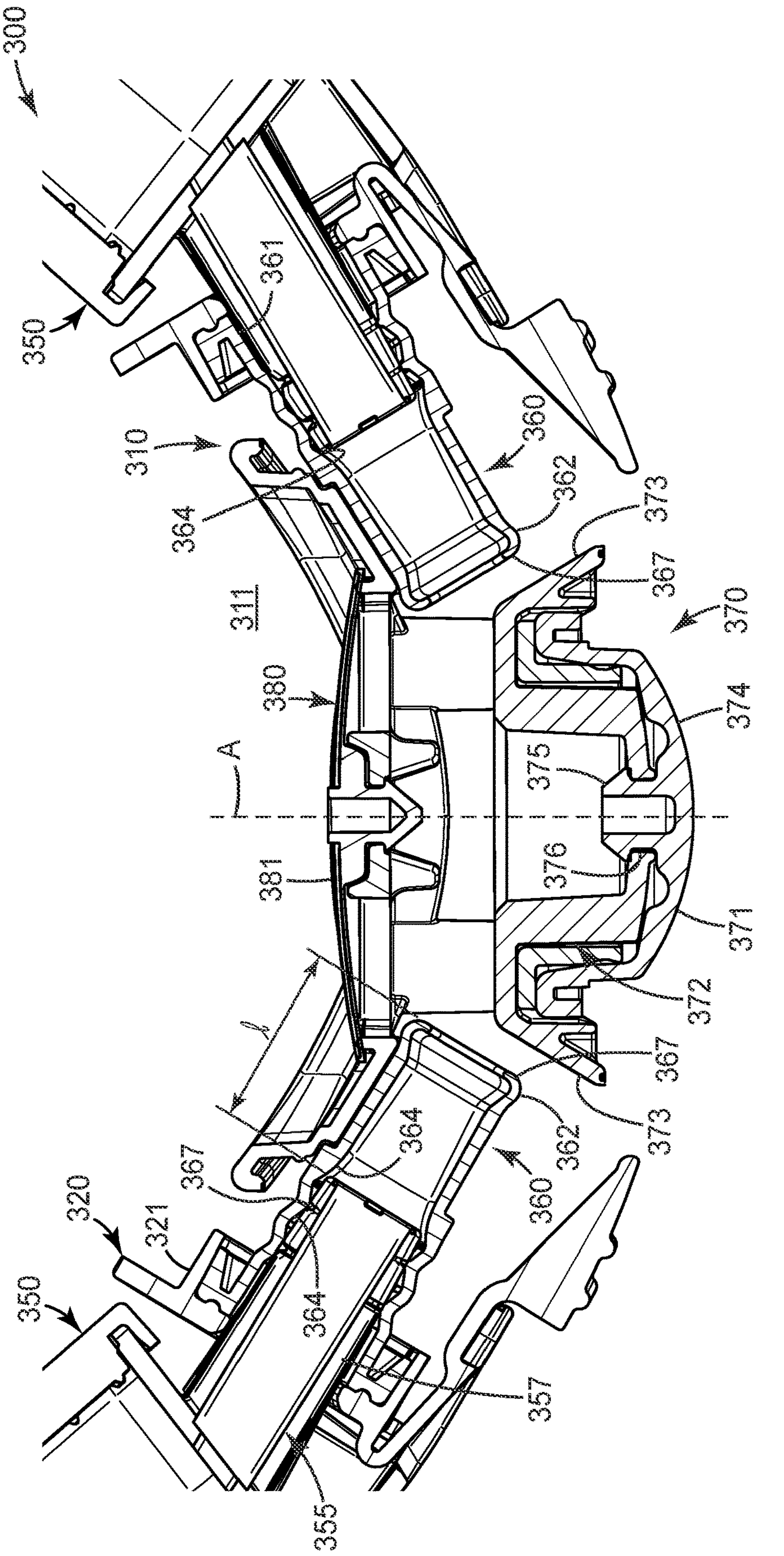
FIG. 4 is a partial cross-sectional view of the respiratory protection device of FIG. 3 including first and second breathing air source components.
Figure 5:
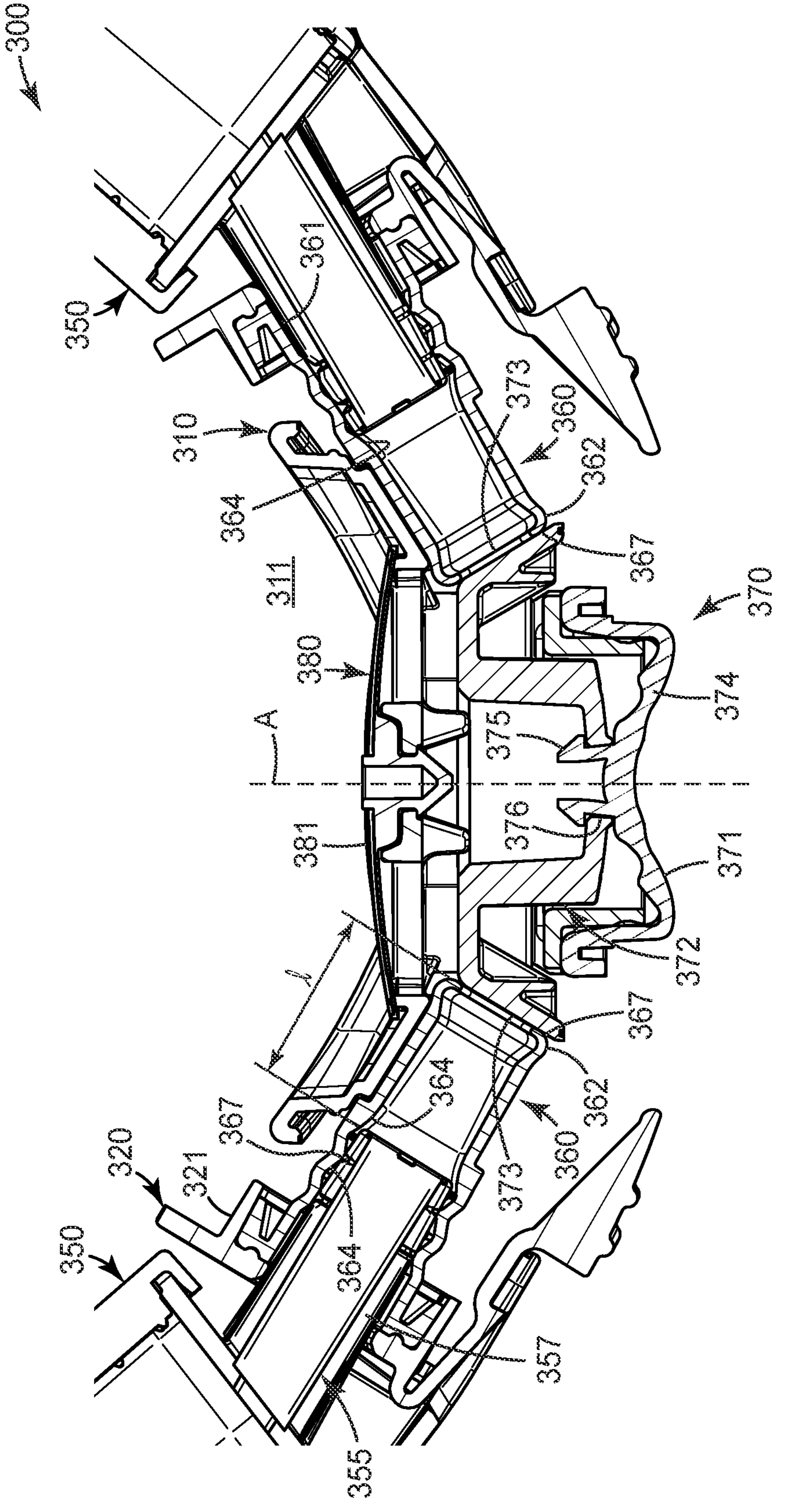
FIG. 5 is a partial cross-sectional view of the respiratory protection device of FIG. 3 showing a valve assembly in a closed configuration.

Referring to FIGS. 3-5, partial cross-sectional views of a respiratory protection device 300 are shown. Respiratory protection device 300 includes a mask body 310, (portions of which are omitted in FIGS. 3-5) defining a breathable air zone 311, and in some embodiments may be similar to respiratory protection device 100 described above. Respiratory protection device 300 includes a valve assembly 370 that selectively blocks airflow from one or more breathing air source components so that a user may perform a fit test.

Valve assembly 370 includes an actuator 371 and a plunger 372 having one or more sealing surfaces 373. Actuator 371 is operable by a user to move valve assembly 370 between open and closed configurations. Actuator 371 may be a button, such as an over-molded elastomeric push-button, slidable button, or the like, that may be pressed inward or otherwise operated to move plunger 372. For example, actuator 371 may be pressed inwardly to cause plunger 372 to move towards elastomeric seals 360. In various exemplary embodiments, actuator 371 may alternatively or additionally include a twist mechanism, lever, slider, or other appropriate actuator 371 operable to move valve assembly between open and closed configurations. In some embodiments, valve assembly may be supported at least partially between a front portion of mask body 310 (not shown in FIGS. 3-5) that engages or is integral with a rear portion of mask body 310 that at least partially defines breathable air zone 311.

In an open configuration shown in FIGS. 3-4, air may flow from filter cartridges 350, through elastomeric seals 360, one or more fluid communication components 380 including a diaphragm or flap valve 381, for example, and into breathable air zone 311. In a closed configuration shown in FIG. 5, sealing surface 373 is in sealing engagement with a respective second end region 362 of elastomeric seal 360. Sealing engagement between sealing surface 373 and elastomeric seal 362 substantially prevents airflow from filter cartridges 350 (FIG. 4) to breathable air zone 311. For example, plunger 372 includes a first sealing surface 373 that may sealingly engage with second end region 362 of a first elastomeric seal 360. Plunger 373 may include a second sealing surface 373 that may sealingly engage with second end region 362 of a second elastomeric seal 360. One or more additional sealing surfaces may be provided by plunger 372 to selectively block one or more fluid paths from a breathing air source component.

Valve assembly 370 may be biased to return to a desired configuration in the absence of an applied force by a user. For example, valve assembly 370 includes one or more resilient members that return valve assembly 370 to an open configuration (FIG. 3-4) when released by a user. In an exemplary embodiment, actuator 371 is an elastomeric button that acts as a resilient member biasing plunger 372 towards the open configuration in which sealing surfaces 373 are out of sealing engagement with second end regions 362 of elastomeric seals 360. Actuator 371 may include a flexible web 374 attached to an outer wall or other rigid component of mask body 310 to support actuator 371 and bias actuator 371 to the open configuration. Web 374 is formed of a flexible or compliant material that is able to elastically deform when actuator is pressed inwardly by a user, while acting to return valve assembly 370 to the open configuration in the absence of an applied force by the user. Alternatively or additionally, valve assembly 370 may include one or more resilient members. In various exemplary embodiments, a coil spring, leaf spring, or elastomeric band, for example, may be provided to bias valve actuator 371 and/or plunger 372 towards the open position.

Actuator 371 and plunger 372 may be connected, directly or indirectly, to facilitate operation between the open and closed configurations. In an exemplary embodiment, plunger 372 has greater rigidity or stiffness compared to actuator 371. Actuator 371 and plunger 372 may be joined by a snap-fit connector 375 of actuator 371 positioned through an aperture 376 of plunger 372. Alternatively or in addition, actuator 371 and plunger 372 may be joined by rivets, mechanical fasteners, adhesive, or one or more intermediate components, for example. A substantially rigid plunger 372 may facilitate robust sealing engagement with a substantially flexible or compliant second end region 362 of elastomeric seal 360.

In use, a breathing air source component, such as filter cartridge 350, may be engaged with receiver 320. Receiver 320 is configured such that outlet nozzle 355 of filter cartridge 350 may slide into a channel 365 defined by elastomeric seal 360. Outer surface 357 of outlet nozzle 355 contacts inner surface 364 of elastomeric seal 360 to provide sealing engagement between filter cartridge 350 and receiver 320. A rigid outer portion 321 may provide substantial structural support and stability between mask body 310 and filter cartridge 350 while engagement between elastomeric seal 360 and filter cartridge 350 provides an adequate seal to prevent ingress of unwanted contaminants or debris from the external environment.

In an exemplary embodiment, outer surface 357 of outlet nozzle 355 may be relatively larger than channel 365 defined by inner surface 364 to promote an interference fit and a snug sealing engagement between outlet nozzle 355 and elastomeric seal 360. Alternatively or in addition, elastomeric seal 360 may include sections of varying wall thickness and/or having a contoured shape. For example, inner surface 364 may include one or more ribs 367 positioned at a location configured to contact outer surface 357 of outlet nozzle 355. One or more ribs 367 promote continuous contact around a perimeter of outlet nozzle to provide an adequate seal. Furthermore, one or more ribs 367 may provide an area of concentrated pressure between outlet nozzle 355 and elastomeric seal 360 that may promote robust sealing without requiring excessive force by a user when engaging filter cartridge 350 with receiver 320.

At least a portion of elastomeric seal 360 may be floating or otherwise not in direct contact with a rigid component of mask body 310, such as rigid outer portion 321, that would constrain outward elastic deformation or expansion. Elastomeric seal 360 is able to flex and/or articulate while outlet nozzle 355 is sealingly engaged in channel 365, and may track or follow movement of outlet nozzle 355 and/or filter cartridge 350. A robust seal may thus be maintained even during relative movement between mask body 310 and filter cartridge 350.

With mask body 310 in a position of use over a mouth and/or nose of a user, and one or more filter cartridges 350 engaged to mask body 310, valve assembly 370 may be operated from the open configuration to the closed configuration to perform a fit test. Operation of actuator 371, by pressing actuator 371 inwardly for example, causes plunger 371 to move linearly from the open position (FIG. 4) to the closed configuration (FIG. 5). In the closed configuration, a substantially planar contact surface of sealing surface 373 is aligned with perimeter 367 of second end region 362 and in sealing engagement with second end region 362 of elastomeric seal 360.

Operation of valve assembly 370 from the open configuration to the closed configuration allows a user to perform a fit test to confirm an appropriate seal is formed between mask body 310 and the user's face, for example, by providing an indicator of the presence and/or absence of a leak that may be observed by the wearer. When valve assembly 370 is in the closed configuration, air is prevented from entering breathable air zone 311 from filter cartridges 350. Inhalation by a wearer in the closed configuration thus creates a negative pressure within mask body 310, and may cause increasingly greater difficulty for the user to further inhale. Alternatively or additionally, inhalation in the closed configuration may cause compliant face contacting portion **310*b* to deflect inwardly if a seal is formed with the user's face. If an adequate seal is not achieved, a negative pressure may not be created and associated indicators of an adequate seal may not be present. Accordingly, operation of valve assembly 370 to the closed configuration, followed by inhalation by the user, provides an indication of whether an adequate seal is formed between respiratory protection device 300** and the user's face.

Actuator 371 and/or plunger 372 may be configured to move linearly along a longitudinal axis between open and closed configurations. For example, actuator 371 and/or plunger 372 may move linearly between open and closed configurations along a longitudinal axis (A) extending centrally through actuator 371 and/or plunger 372. Longitudinal axis (A) may extend orthogonal to an outer surface of actuator 371. In some exemplary embodiments, longitudinal axis (A) passes substantially centrally through actuator 371, plunger 372 and fluid communication component 380.

First and/or second sealing surfaces 373 may similarly move linearly along an axis of travel between open and closed configurations, and may be angled and offset from longitudinal axis (A). For example, first sealing surface 373 includes a substantially planar major surface that is not substantially perpendicular to, or parallel with, a plane extending vertically through longitudinal axis (A). Alternatively or additionally, the axis of travel of first sealing surface 373 may be non-coaxial or non-parallel with a longitudinal axis (B) of elastomeric seal 360 extending centrally through channel 365 at second end region 362. In some embodiments, the angle of first sealing surfaces 373 relative to longitudinal axis (A) is substantially identical to the angle of second end region 362 relative to longitudinal axis (A) such that first sealing surface 373 and perimeter 367 of second end region 362 are substantially aligned in the closed configuration. In this way, plunger 362 and/or first sealing surface 373 may travel linearly from an open configuration to the closed configuration while creating adequate contact around perimeter 367 of second end region 362 to provide adequate sealing. First sealing surface 373 angled as described herein facilitates appropriate contact and robust sealing engagement between first sealing surface 373 and second end region 362 of elastomeric seal 360.

Valve assembly 370 may include one or more components that facilitate linear travel of actuator 371 and/or plunger 372. For example, actuator 371 and/or plunger 372 may travel along a shaft or rail positioned along longitudinal axis (A). Alternatively or additionally, actuator 371 and/or plunger 372 may travel along a shaft or rail parallel to and spaced from longitudinal axis (A). In some embodiments, actuator 371 and/or plunger 372 may "float" or be supported substantially by flexible web 374 of actuator 371. Flexible web 374 may maintain actuator 371 and/or plunger 372 in substantial alignment with longitudinal axis (A) during movement between open and closed configurations, and maintain sealing surface 373 in position for appropriate alignment with second end region 362 of elastomeric seal 360.

Plunger 372 and elastomeric seal 360 are configured to promote consistent and robust sealing in a closed configuration. Contact between, for example, relatively more rigid sealing surface 373 and relatively more compliant second end region 362 of elastomeric seal 360 facilitates sealing engagement despite potential relative movement between components and/or imprecise travel of plunger 372. The displacement of plunger 372 between open and closed configurations may vary slightly based on a force applied by a user or dimensional tolerances of valve assembly 370 and other components of respiratory protection device 300. For example, plunger 372 may be displaced over a predetermined minimum distance in order for sealing surface 373 to contact second end region 362 of elastomeric seal 360. Appropriate compliance of second end region 362 by flexing or conforming to the position of sealing surface 373 facilitates consistent sealing engagement even if sealing surface 373 travels a distance greater than the predetermined distance. Similarly, consistent sealing engagement may be maintained even if sealing surfaces 373 move laterally or away from an expected axis due to uneven force applied by a user or broad dimensional tolerances of components of respiratory protection device 300 that may result in imprecise movement between components. In some exemplary embodiments, elastomeric seal 360 may have material surface characteristics such that second end region 362 "grips" or otherwise moves with sealing surface 373, rather than easily sliding along sealing surface 373, promoting consistent sealing engagement without requiring a user to exert excessive force on actuator 371.

Figure 6:
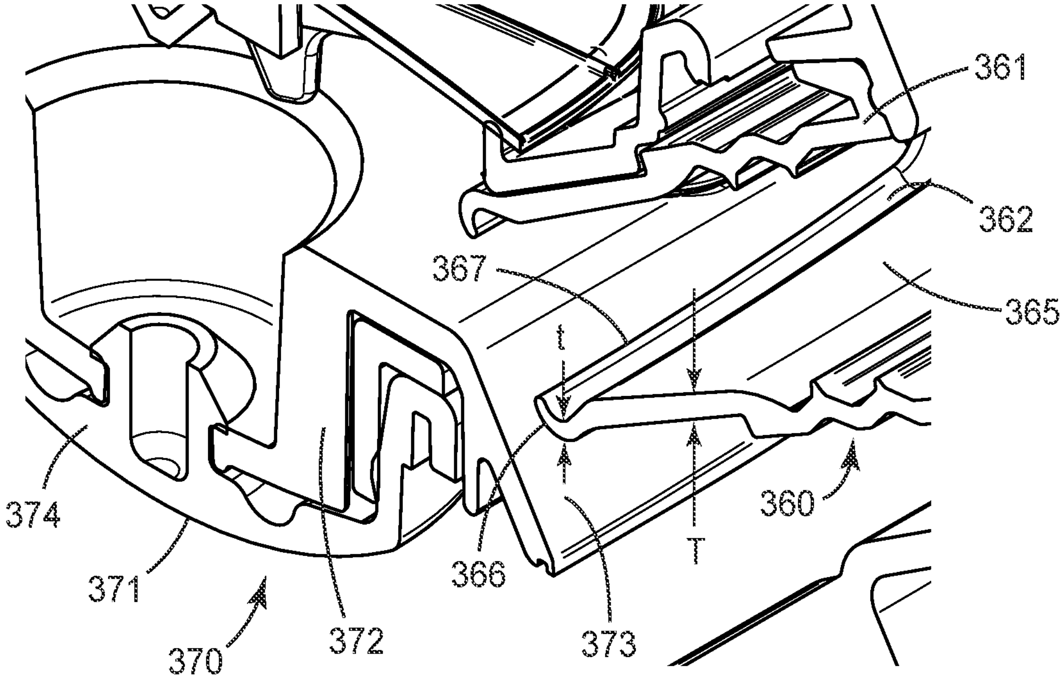
FIG. 6 is an enlarged cross-sectional perspective view of the respiratory protection device of FIG. 3 showing a valve assembly in an open configuration.
Figure 7:
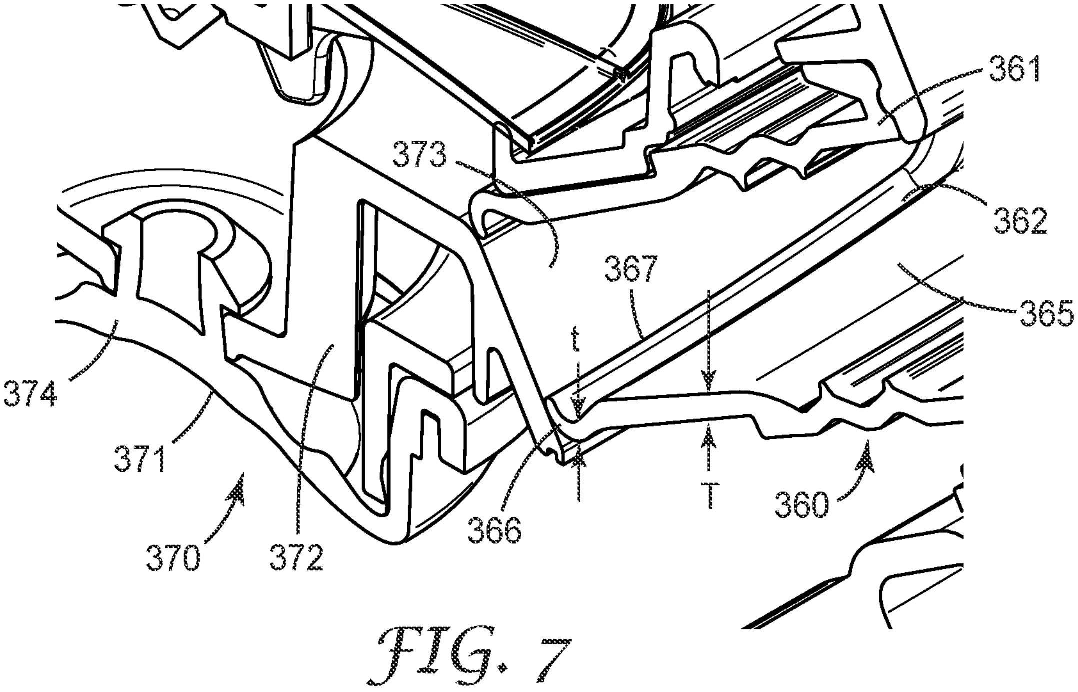
FIG. 7 is an enlarged cross-sectional perspective view of the respiratory protection device of FIG. 3 showing a valve assembly in a closed configuration.

Referring to FIGS. 6-7, enlarged perspective views are shown including sealing surface 373 and second end region 363 of elastomeric seal 360 in an open configuration (FIG. 6) and a closed configuration (FIG. 7). Second end region 362 includes an inwardly-turned lip 366 providing a compliant perimeter 367 for contact with sealing surface 373. Inwardly-turned lip 366 may be tapered and/or may include one or more locations of reduced thickness. A relatively smaller thickness provides an area of increased flexibility or compliance. For example, elastomeric seal 360 may include one or more intermediate portions having a major thickness (T) and one or more portions of reduced thickness (t). In some exemplary embodiments, major thickness (T) may be between 110% and 400%, 150% and 300%, or about 200% of reduced thickness (t). Such relative thicknesses provide a focused area of compliance that promotes deflection of inward turned lip 366 when engaged by sealing surface 373.

Inwardly-turned lip 366 has a shape that facilitates contact between sealing surface 373 and an outer surface 363 of elastomeric seal 360. Contact by sealing surface 363 may cause inwardly-turned lip 366 to flex or bend, for example, towards channel 365 and/or first end 361. Inwardly-turned lip 366 may flex non-uniformly around a perimeter of second end region 362 to facilitate consistent sealing engagement with sealing surface 373, if sealing surface 373 contacts second end region 362 with a non-uniform pressure or angle, for example. Furthermore, a negative-pressure generated during a fit test may pull or otherwise act on inwardly-turned lip 366 to flex outwardly towards sealing surface 373, promoting sealing contact while a fit test is performed.

Alternatively or additionally, elastomeric seal 360 may conform or articulate along its longitudinal length to facilitate consistent sealing engagement with sealing surface 373. For example, elastomeric seal 360 includes at least a portion that is floating or otherwise not constrained by a rigid component of mask body 310, such as second end region 362. Second end region 362 may articulate or bend relative to other components of mask body 310 to facilitate sealing engagement with sealing surface 373 over a range of angles or positions of sealing surface 373 in a closed configuration. Similarly, one or more portions along a length of elastomeric seal 360 between first and second ends may be at least partially unconstrained by a rigid component to allow compliance and/or articulation of elastomeric seal 360 when contacted by sealing surface 373.

In some exemplary embodiments, elastomeric seal 360 includes a length (1) (FIG. 5) that extends beyond a location configured to receive a breathing air source component. For example, elastomeric seal 360 extends further towards longitudinal axis (A) than a leading end 356 of outlet nozzle 355 when filter cartridge 350 is engaged at retainer 320. Elastomeric seal 360 along length (1) is unconstrained by a breathing air source component, and provides a length of elastomeric seal 360 that further promotes compliance to maintain sealing engagement with sealing surface 373.

Figure 8:
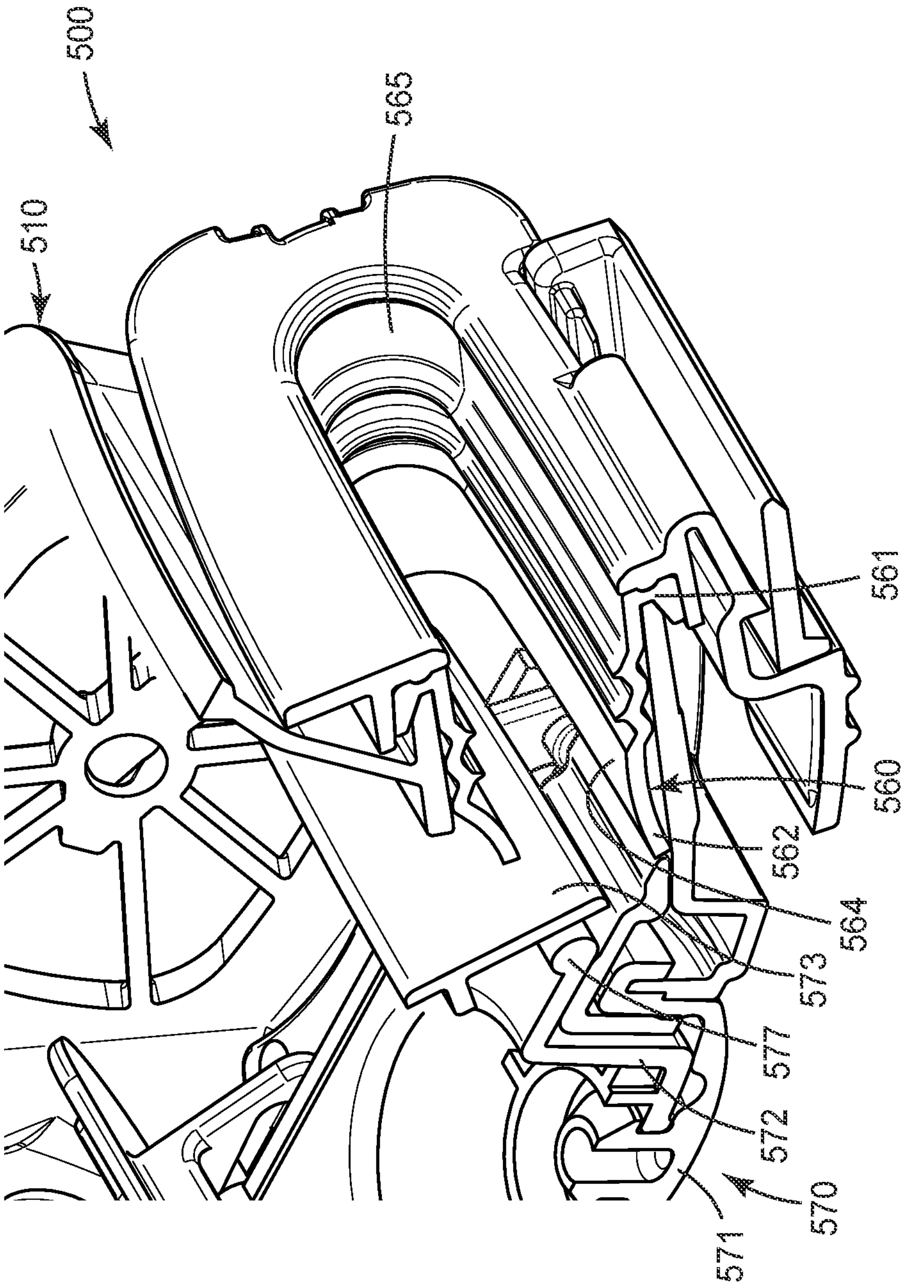
FIG. 8 is a partial cross-sectional perspective view of an exemplary respiratory protection device.
Figure 9:
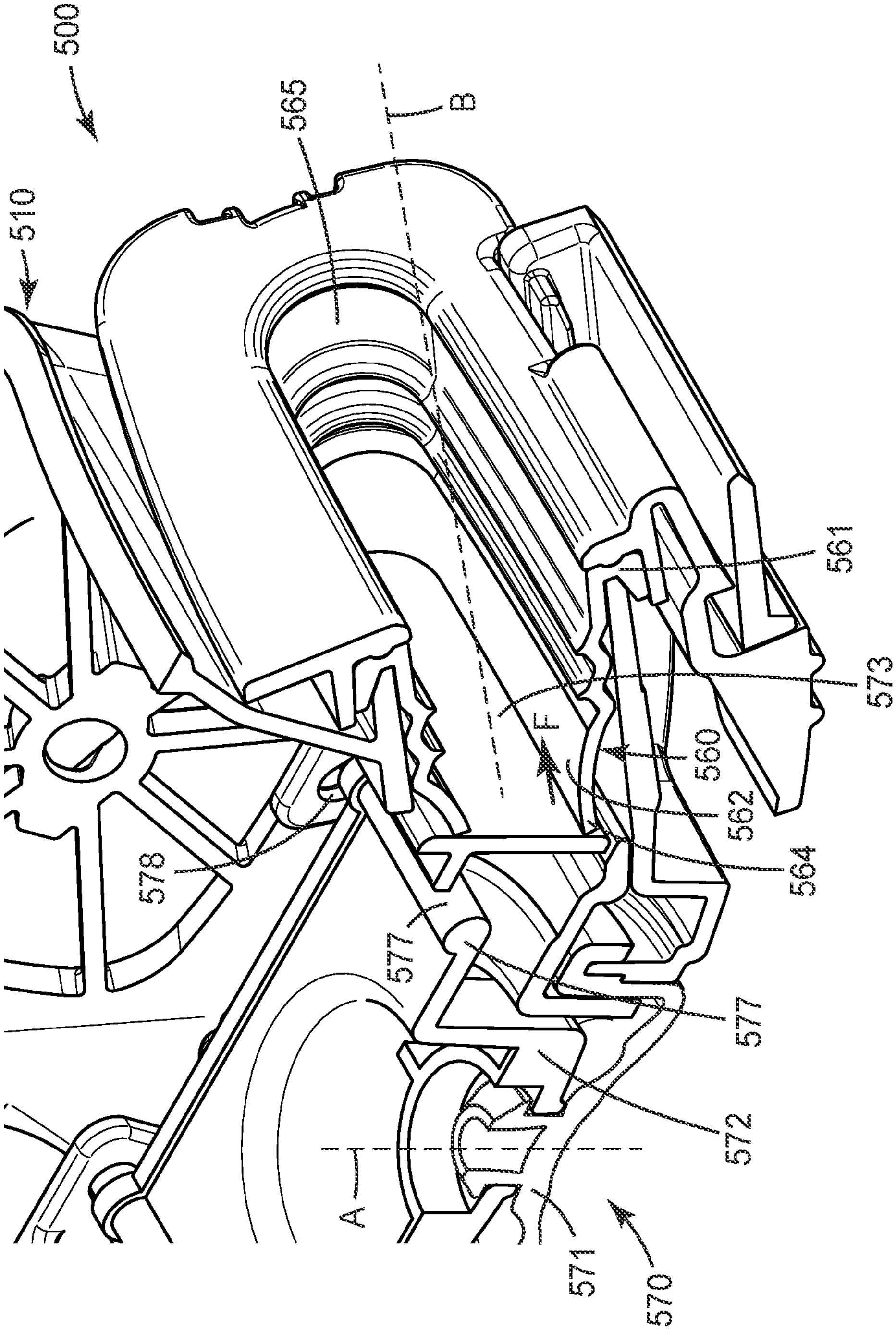
FIG. 9 is a partial cross-sectional view of the respiratory protection device of FIG. 8 showing a valve assembly in a closed configuration.

Referring to FIGS. 8-9, a partial cross-sectional view of a respiratory protection device 500 is shown including a valve assembly 570 having one or more sealing surfaces 573 that pivot between open and closed configurations. Respiratory protection device 500 includes a mask body 510 (portions of which are omitted in FIGS. 8-9) defining a breathable air zone, and in some embodiments is similar to respiratory protection device 300 described above. Respiratory protection device 500 includes a valve assembly 570 that may selectively block airflow from one or more breathing air source components.

Valve assembly 570 includes an actuator 571, plunger 572 and one or more sealing surfaces 573. Actuator 571 is operable by a user to move valve assembly 570 between open and closed configurations, and may include an elastomeric button or other appropriate actuator. Actuator 571 and/or at least a portion of plunger 572 may move linearly between open and closed configurations, while sealing surface 573 pivots between an open configuration (FIG. 8) and a closed configuration (FIG. 9).

Sealing surfaces 573 may be at least partially movable independent of actuator 571 and/or a portion of plunger 572. Sealing surfaces 573 and plunger 572 may include a slider joint having a boss 577 and slide 578. Alternatively or in addition, sealing surfaces 573 and plunger 572 may include a cam and follower, for example. Linear movement of actuator 571 and/or at least a portion of plunger 572 causes slide 578 to move along boss 577, resulting in pivoting of sealing surfaces 573. In various other exemplary embodiments, valve assembly 570 may include a hinge, spring, or other appropriate components so that sealing surfaces may pivot into sealing engagement with second end region 562 of elastomeric seal 560.

Sealing surfaces 573 include a major surface that provides consistent contact with second end region 562 of elastomeric seal 560. For example, sealing surfaces 573 include substantially planar surfaces positioned in alignment with a perimeter of second end region 562. In an exemplary embodiment, a force (F) provided by sealing surface 573 against second end region 562 acts in a direction substantially perpendicular to a plane across channel 565 at second end region 562. For example, for (F) may act in a direction substantially parallel with longitudinal axis (B) (FIG. 9) extending centrally through channel 565 at second end region 562. In such an arrangement, the major direction of force (F) promotes consistent sealing engagement with elastomeric seal 560 while limiting the required force a user must exert on actuator 571.

Second end region 562 may include an inwardly-turned lip providing a compliant perimeter for contact with sealing surface 573. The inwardly-turned lip, in some embodiments, may be similar to inwardly-turned lip 366 described above. The inwardly-turned lip may provide a focused area of compliance, and may be configured to deflect towards sealing contact with sealing surface 573 under negative pressure within mask body 510.

Sealing surface 573 may include one or more protrusions that may promote consistent sealing engagement with elastomeric seal 560. One or more protrusions provide an outwardly extending surface that promotes robust sealing engagement with second end region 562, even over a range of positions of sealing surface 573. Alternatively or additionally, protrusions may extend slightly within channel 565 and contact inner surface 564 of elastomeric seal 560, and/or may extend around a perimeter of second end region 562 and contact outer surface 563 of elastomeric seal 560.

Figure 10A:
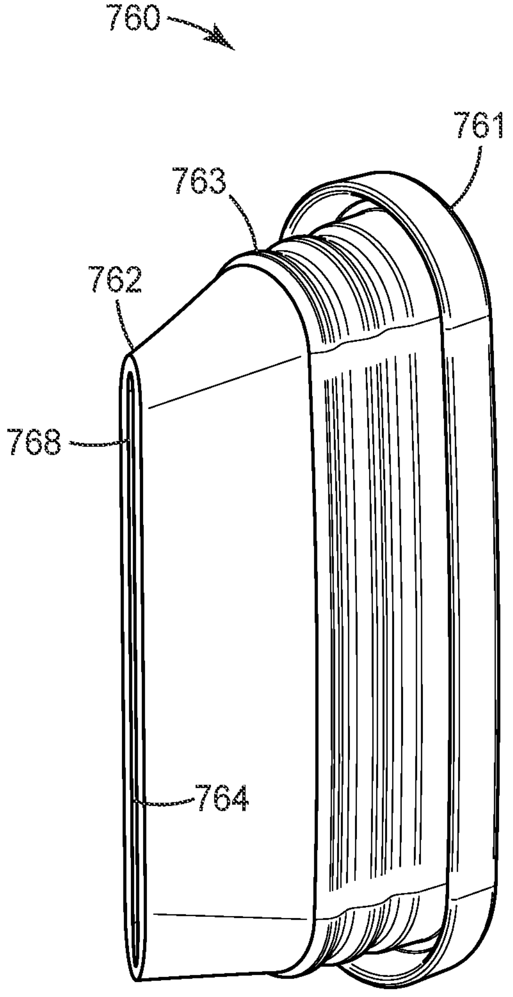
FIGS. 10A and 10B are perspective views of an exemplary elastomeric seal.
Figure 10B:
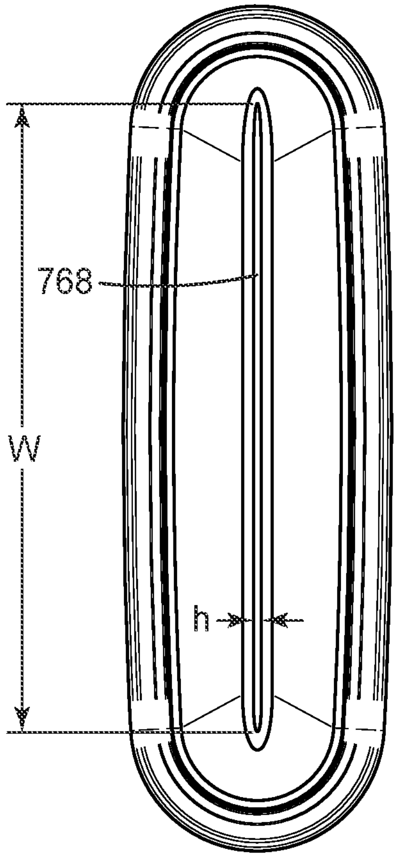

Referring to FIGS. 10A-10B, another exemplary elastomeric seal 760 is shown that facilitates a fit-test and that may include a check-valve capability. Elastomeric seal 760 includes a first end region 761, a second end region 762, an outer surface 763 and an inner surface 764 at least partially defining a channel 765 between first and second end regions 761, 762. First end region 761 may be connected to a rigid component of a mask body, such as receiver 120 (FIG. 1). In an exemplary embodiment, elastomeric seal 760 provides an elastomeric sleeve that at least partially surrounds an outer surface of a breathing air source component, and may have features similar to elastomeric seal 260 in appropriate embodiments.

Second end region 762 includes an elongated and/or tapered end. The cross-sectional area of channel 765 narrows towards second end region 762, until opposing portions of inner surface 764 defining 765 are in contact or nearly in contact. In some embodiments, a reduced material thickness and a narrow channel provide a check-valve capability integral to elastomeric seal 760. For example, second end region 762 may expand when air flows through elastomeric seal 760 from first end region 761 to second end region 762, such as when a user inhales. Conversely, second end region 762 may close or constrict due to air flow from second end region 762 towards first end region 761. An elastomeric seal having an integral check-valve capability may simplify a respiratory protection device by reducing the need for a separate check-valve or other intake valve component, reducing cost and associated assembly time of an additional component, and improving comfort by reducing weight. Furthermore, such an elastomeric seal can provide flexibility in the overall design and configuration of a respiratory protection device.

An opening 768 of channel 765 at second end region 762 has a width (w) that is substantially greater than a height (h) of the opening in a neutral configuration in which air is not flowing through elastomeric seal 760. In various exemplary embodiments, width (w) is between 10 and 200, 25 and 100, or about 40 times greater than height (h) of opening 768. In some exemplary embodiments, second end region 762 is substantially closed when air is not flowing through elastomeric seal 760.

Figure 11:
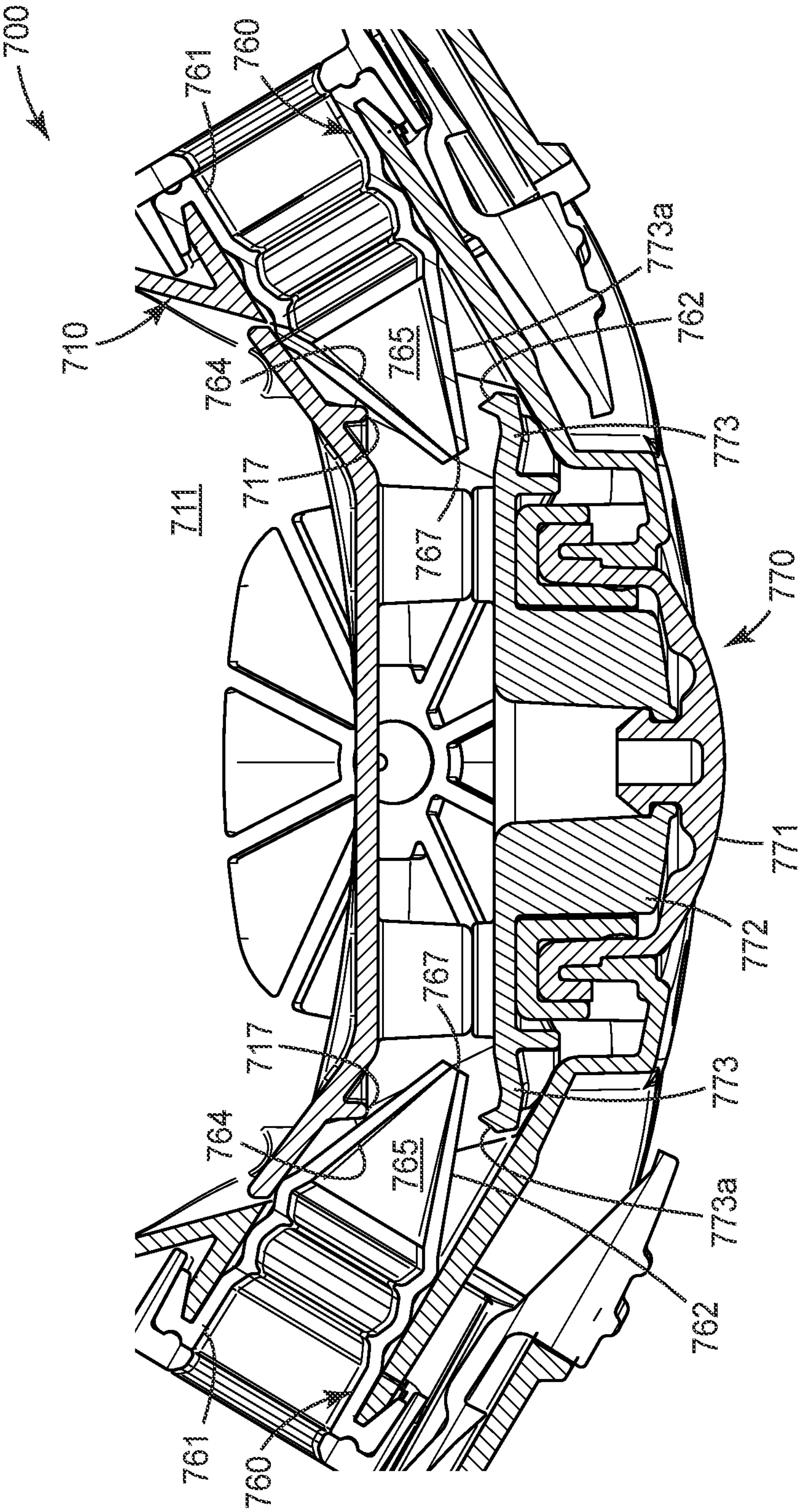
FIG. 11 is a partial cross-sectional view of an exemplary respiratory protection device.
Figure 12:
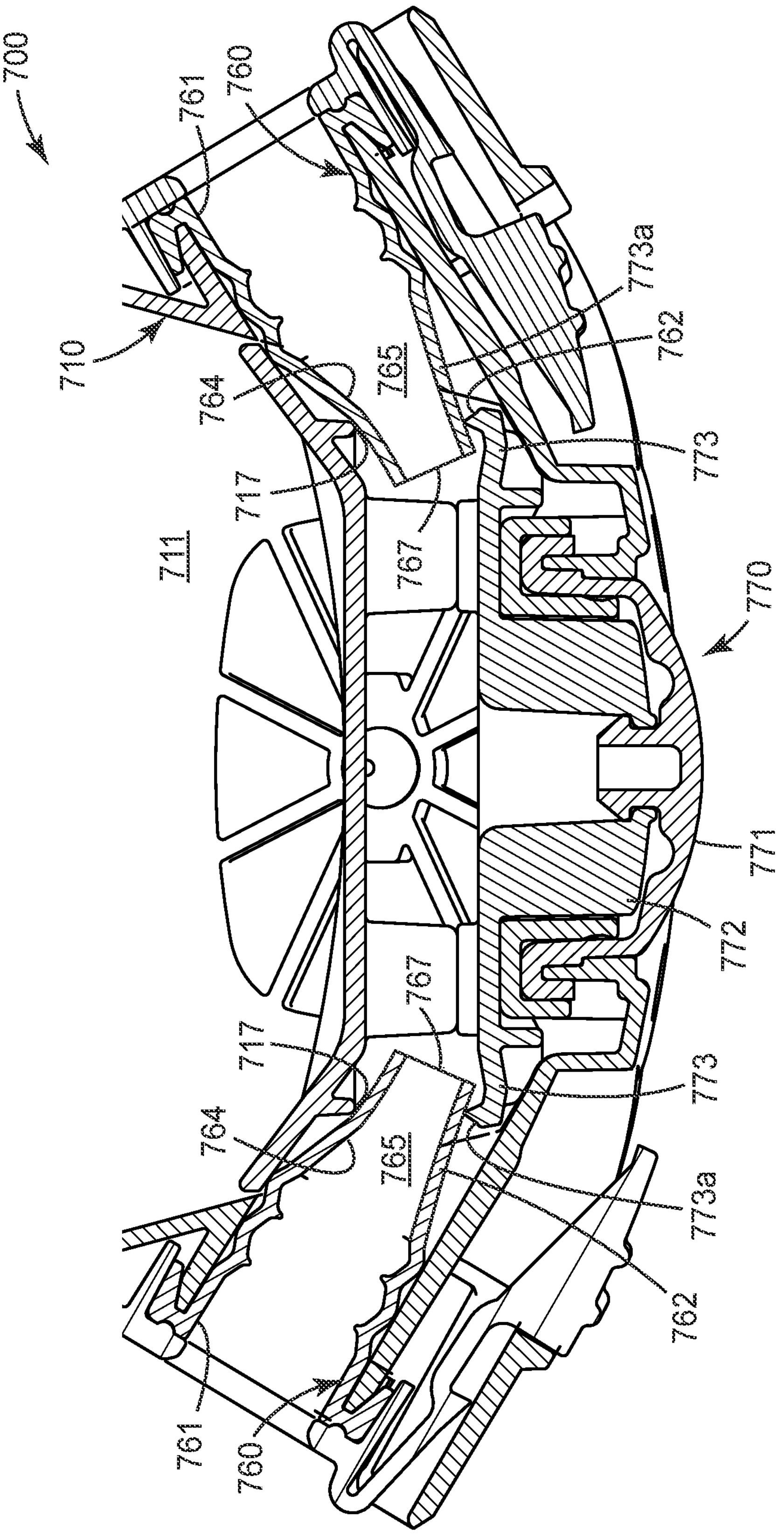
FIG. 12 is a partial cross-sectional view of the respiratory protection device of FIG. 11.
Figure 13:
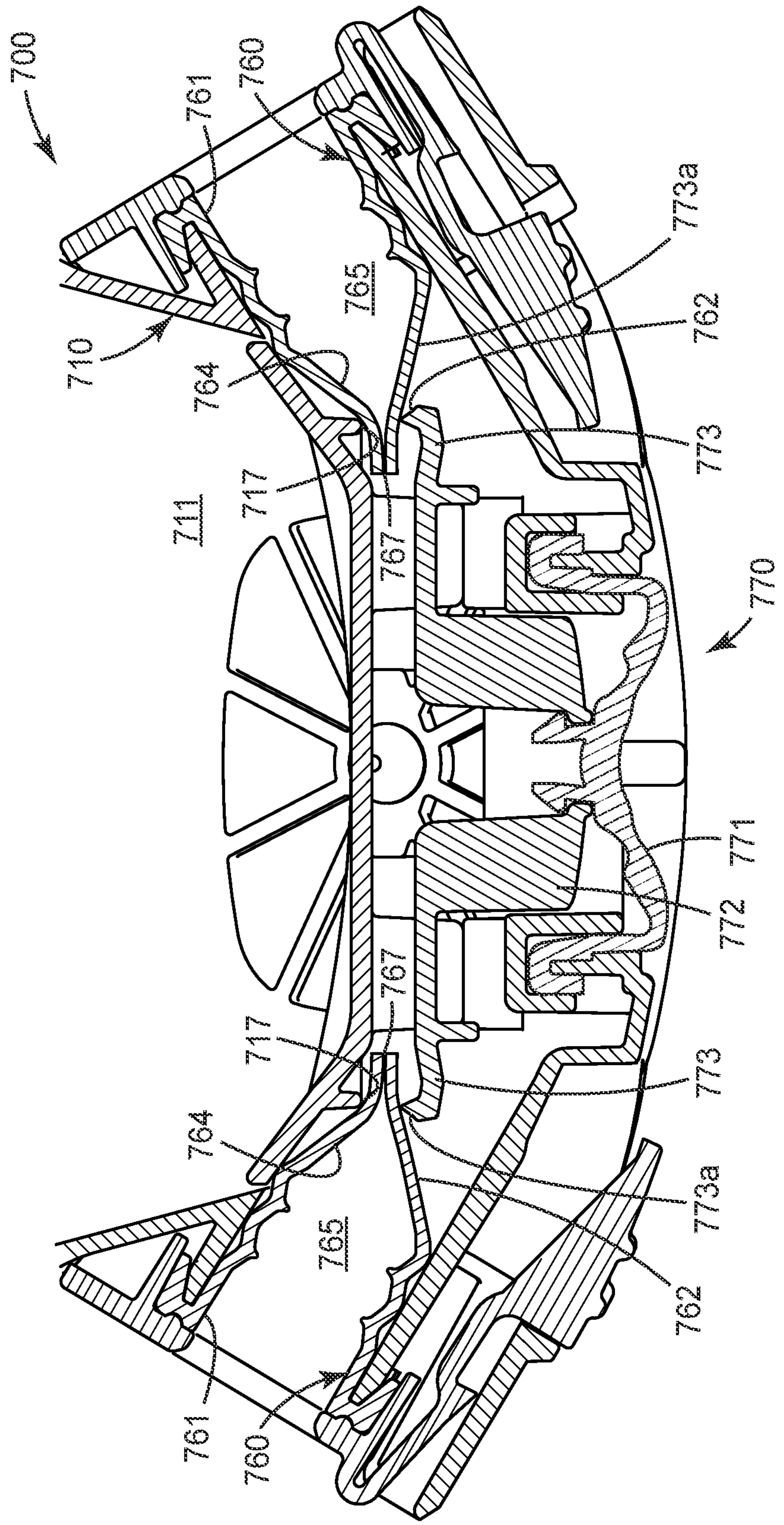
FIG. 13 is a partial cross-sectional view of the respiratory protection device of FIG. 11 showing a valve assembly in a closed configuration.

Referring to FIGS. 11-13, partial cross-sectional views of a respiratory protection device 700 is shown including elastomeric seal 760. Respiratory protection device 700 includes a mask body 710, (portions of which are omitted in FIGS. 11-13) defining a breathable air zone 711, and in some embodiments may be similar to respiratory protection device 300 described above. Respiratory protection device 700 includes a valve assembly 770 that allows airflow from one or more breathing air source components to be selectively blocked by clamping elastomeric seal 760 so that a user may perform a fit test.

Valve assembly 770 includes an actuator 771 and a plunger 772 having one or more sealing surfaces 773. Actuator 771 is operable by a user to move valve assembly 770 between an open configuration (FIGS. 11-12) and a closed configuration (FIG. 13). Actuator 771 may be a button, such as an over-molded elastomeric push-button, slidable button, or the like, that may be pressed inward to move plunger 772. For example, actuator 771 may be pressed inwardly to cause plunger 772 to move towards elastomeric seals 760. In various exemplary embodiments, actuator 771 may alternatively or additionally include a twist mechanism, lever, slider, or other appropriate actuator 771 operable to move valve assembly between open and closed configurations.

FIG. 11 shows respiratory protection device 700 and elastomeric seal 760 in a neutral configuration. Valve assembly 770 is in an open configuration, and opening 767 of elastomeric seal 760 is substantially closed while no air flows through elastomeric seal 760. Respiratory protection device 700 may be in a neutral configuration between breaths of a user, for example, or when respiratory protection device 700 is not positioned over a user's mouth and/or nose.

Referring to FIG. 12, channel 765 proximate second end region 762 allows air flow through elastomeric seal 760 in a direction from first end region 761 towards second end region 762. Channel 765, and particularly height (h), may be expanded proximate second end region 762 due to air flow caused by inhalation of a user or air delivered from a breathing air source component. A reduced thickness and elastomeric material construction of elastomeric seal 760 facilitates expansion with relatively low pressure drop. Furthermore, an elongated or non-circular shape of channel 765 at second end region 762 may facilitate expansion of second end region 762 with a relatively low pressure drop. When airflow ceases, or the direction of airflow is reversed, second end region 762 may collapse and/or return to a neutral configuration (FIG. 11).

Referring to FIG. 13, valve assembly 770 is shown in a closed configuration. Sealing surface 773 contacts outer surface 763 of elastomeric seal 760 to clamp or otherwise close channel 765. Sealing surface 773 may move linearly between the open configuration (FIG. 11) and the closed configuration (FIG. 12) to clamp second end region 762 against one or more rigid components of mask body 710. In some exemplary embodiments, channel 765 may be blocked by opposing interior surfaces 764 in contact with one another. Mask body 710 may include one or more ribs or protrusions 717 that interact with sealing surfaces 773 and/or elastomeric seal 760 to provide a surface that second end region 762 may be clamped against. Sealing surface 773 similarly may include a flanged end and/or protrusion **773*a* that creates focused pressure on second end region 762 to promote robust engagement with elastomeric seal 760**.

Respiratory protection devices according to various embodiments of the present disclosure may provide one or more of the following advantages. A valve assembly operable between open and closed configurations facilitates ready performance of a fit test, and may facilitate operation of a single actuator to block airflow from two or more breathing air source components. Sealing engagement with an elastomeric seal facilitates consistent sealing engagement over a variety of conditions, including varied force applied by a user and broad dimensional tolerances of components. Furthermore, an elastomeric seal may provide appropriate compliance to facilitate sealing with a component of a valve assembly, and may be configured to have one or more floating portions that facilitate sealing engagement while accommodating relative movement between the elastomeric seal, valve assembly, and/or breathing air source component. A respiratory protection device having an elastomeric seal that may sealingly engage with a breathing air source component and a valve assembly reduces components, complexity, and associated manufacturing costs, while providing a robust sealing engagement under a variety of conditions and environments so that an accurate fit test may be readily performed by a user.

The foregoing detailed description and examples have been given for clarity of understanding only. No unnecessary limitations are to be understood there from. It will be apparent to those skilled in the art that many changes can be made in the embodiments described without departing from the scope of the disclosure. Any feature or characteristic described with respect to any of the above embodiments can be incorporated individually or in combination with any other feature or characteristic, and are presented in the above order and combinations for clarity only. Thus, the scope of the present disclosure should not be limited to the exact details and structures described herein. Moreover, although features may be described herein as acting in certain combinations and/or initially claimed as such, one or more features from a claimed combination can in some cases be excised from the combination, and the claimed combination may be directed to a subcombination or variation of a subcombination.

What is claimed is:

1. A respiratory protection device, comprising:

a mask body defining a breathable air zone for a wearer and having a first receiver, the first receiver comprising a first elastomeric seal having a first end region and a second end region and defining a first channel configured to at least partially receive a first breathing air source component;

a valve assembly operable between an open configuration and a closed configuration in which fluid communication through the first breathing air source component to the breathable air zone is prevented;

wherein a first sealing surface of the valve assembly is at an oblique angle to a longitudinal axis of the valve assembly and configured to sealingly contact a surface of the second end region of the first elastomeric seal when the valve assembly is in the closed configuration, wherein the surface of the second end region is arranged to be at an oblique angle along the longitudinal axis;

wherein the first elastomeric seal is configured to sealingly engage with the first breathing air source component at the first end region of the first elastomeric seal, and wherein the valve assembly engages with the second end region of the first elastomeric seal when the valve assembly is in the closed configuration to prevent fluid communication between the first breathing air source component and the breathable air; and wherein the first sealing surface is configured to move linearly along the longitudinal axis between the open and closed configurations.

2. The respiratory protection device of claim 1, wherein the valve assembly further comprises an actuator configured to move linearly along the longitudinal axis between the open and closed configurations.

3. The respiratory protection device of claim 1, wherein the breathing air source component is in sealing engagement with the first channel of the first elastomeric seal when attached to the mask body.

4. The respiratory protection device of claim 1, wherein at least a portion of an outer surface of the elastomeric seal is out of contact with a rigid component when the valve assembly is in the open configuration.

5. The respiratory protection device of claim 1, wherein the second end region of the first elastomeric seal is a floating end.

6. The respiratory protection device of claim 1, wherein the second end region of the first elastomeric seal comprises an inward-turned end.

7. The respiratory protection device of claim 1, wherein in the closed configuration the first sealing surface of the valve assembly contacts the outer surface at the inward-turned end.

8. The respiratory protection device of claim 1, wherein the first elastomeric seal has a reduced material thickness at the second end region, the second end region configured to open when air flows from the first end region towards the second end region and configured to close to prevent airflow from the second end region towards the first end region.

9. The respiratory protection device of claim 1, comprising a second breathing air source component configured for attachment to the mask body.

10. The respiratory protection device of claim 9, comprising a second elastomeric seal, wherein the second breathing air source component is in sealing engagement with the second elastomeric seal when attached to the mask body, and a second sealing surface of the valve assembly is in sealing engagement with a second end of the second elastomeric seal in the closed configuration.

11. The respiratory protection device of claim 1, wherein the first receiver is integral with the mask body.

12. The respiratory protection device of claim 1, wherein the first receiver is positioned in an opening defined by the mask body.

13. The respiratory protection device of claim 1, wherein the first elastomeric seal comprises an inner surface defining the channel through the first elastomeric seal, and an outer surface.

14. The respiratory protection device of claim 13, wherein the outer surface is out of contact with a rigid component when the valve assembly is in the open position.

15. The respiratory protection device of claim 13, wherein the valve assembly engages a portion of the outer surface of the first elastomeric seal in the closed configuration.

16. The respiratory protection device of claim 1, wherein the mask body comprises a second receiver, the second receiver comprising a second elastomeric seal having a first end region and a second end region and defining a second channel configured to receive a second breathing air source component.

17. The respiratory protection device of claim 16, wherein a second sealing surface of the valve assembly engages with the second end region of the second elastomeric seal when the valve assembly is in the closed configuration to prevent fluid communication between the second breathing air source component and the breathable air zone, and the second elastomeric seal is configured to sealingly engage with the second breathing air source component at the first end region of the second elastomeric seal.

18. The respiratory protection device of claim 1, wherein the valve assembly is biased towards the open configuration.

19. The respiratory protection device of claim 1, wherein the actuator comprises a button, and the button is depressed when the valve assembly is in the closed configuration.

* * * * *